US007610612B2

(12) United States Patent
Ishibashi et al.

(10) Patent No.: US 7,610,612 B2
(45) Date of Patent: Oct. 27, 2009

(54) DATA TRANSMISSION METHOD, A DATA TRANSMISSION PROGRAM AND A DATA TRANSMISSION SERVER

(75) Inventors: Junichi Ishibashi, Nagano (JP); Masaru Ichikawa, Nagano (JP); Masahiro Tomita, Nagano (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 10/898,362

(22) Filed: Jul. 26, 2004

(65) Prior Publication Data

US 2005/0039012 A1 Feb. 17, 2005

(30) Foreign Application Priority Data

Jul. 28, 2003 (JP) .............................. 2003-280933

(51) Int. Cl.
*H04L 9/32* (2006.01)
(52) U.S. Cl. .............................. 726/2; 726/27; 713/170; 709/206; 709/207
(58) Field of Classification Search .................. 726/22, 726/27; 713/170; 709/206–207
See application file for complete search history.

(56) References Cited

U.S. PATENT DOCUMENTS

| 5,657,390 | A  | * | 8/1997  | Elgamal et al. | ............. | 713/151 |
| 6,865,671 | B1 | * | 3/2005  | Assmann | ..................... | 713/154 |
| 7,188,358 | B1 | * | 3/2007  | Hisada et al. | .................. | 726/2 |
| 2003/0126259 | A1 |   | 7/2003  | Yoshida et al. | | |
| 2003/0236847 | A1 | * | 12/2003 | Benowitz et al. | ............ | 709/206 |
| 2004/0103297 | A1 | * | 5/2004  | Risan et al. | ................. | 713/200 |
| 2004/0172429 | A1 | * | 9/2004  | Goguen | ....................... | 707/206 |
| 2004/0199774 | A1 | * | 10/2004 | Zissimopoulos et al. | .... | 713/179 |
| 2004/0218226 | A1 | * | 11/2004 | Antognini et al. | ........... | 358/402 |
| 2004/0243847 | A1 | * | 12/2004 | Way | ............................ | 713/201 |
| 2007/0005970 | A1 | * | 1/2007  | Trupp et al. | .................. | 713/170 |

FOREIGN PATENT DOCUMENTS

EP  1 143 673  10/2001

(Continued)

OTHER PUBLICATIONS

Levine ("POP before SMTP", Jan. 2000, http://web.archive.org/web/20020413170304/spam.abuse.net/adminhelp/smPbS.shtml).*

(Continued)

*Primary Examiner*—Kambiz Zand
*Assistant Examiner*—Peter Poltorak
(74) *Attorney, Agent, or Firm*—Staas & Halsey LLP

(57) ABSTRACT

A data transmission server can cause identification information of a user who sent data and identification information of the user contained in the data to correspond to each other on one-to-one basis so as to prevent a person from transmitting data by pretending to be others. A memory stores client identification information for identifying the client and user identification information for identifying a user who operates the client, the client identification information and the user identification information being stored in correspondence to each other. The data received from the client is transmitted to the destination only when the client identification information of the client which transmits the data and the user identification information of the user contained in a header part and a data part of the data are stored in the memory in correspondence to each other.

11 Claims, 13 Drawing Sheets

FOREIGN PATENT DOCUMENTS

| | | |
|---|---|---|
| EP | 1143673 A1 * | 10/2001 |
| EP | 1 160 673 | 12/2001 |
| JP | 2002-084310 | 3/2002 |
| JP | 2002-251375 | 9/2002 |
| JP | 2004-064215 | 2/2004 |

OTHER PUBLICATIONS

MailToWeb (Mail2 Web, Feb. 2000, http://web.archive.org/web/20000229161937/mail2web.com.*

R. Levien, "Protecting Internet E-mail From Prying Eyes", Data Communications, McGraw Hill, New York, vol. 25, No. 6, May 1, 1996, pp. 117-118, 120, 12, XP000587586, ISSN: 0363-6399.

Reasons of Rejection Office Action mailed Jun. 10, 2008 issued with respect to the corresponding Japanese Patent Application No. 2003-280933 (1 page) and a English language translation thereof (1 page).

Office Action issued by the Japan Patent Office on Dec. 9, 2008 in the corresponding Japanese Patent Application No. 2003-280933 (1 page with 2 pages of English translation).

* cited by examiner

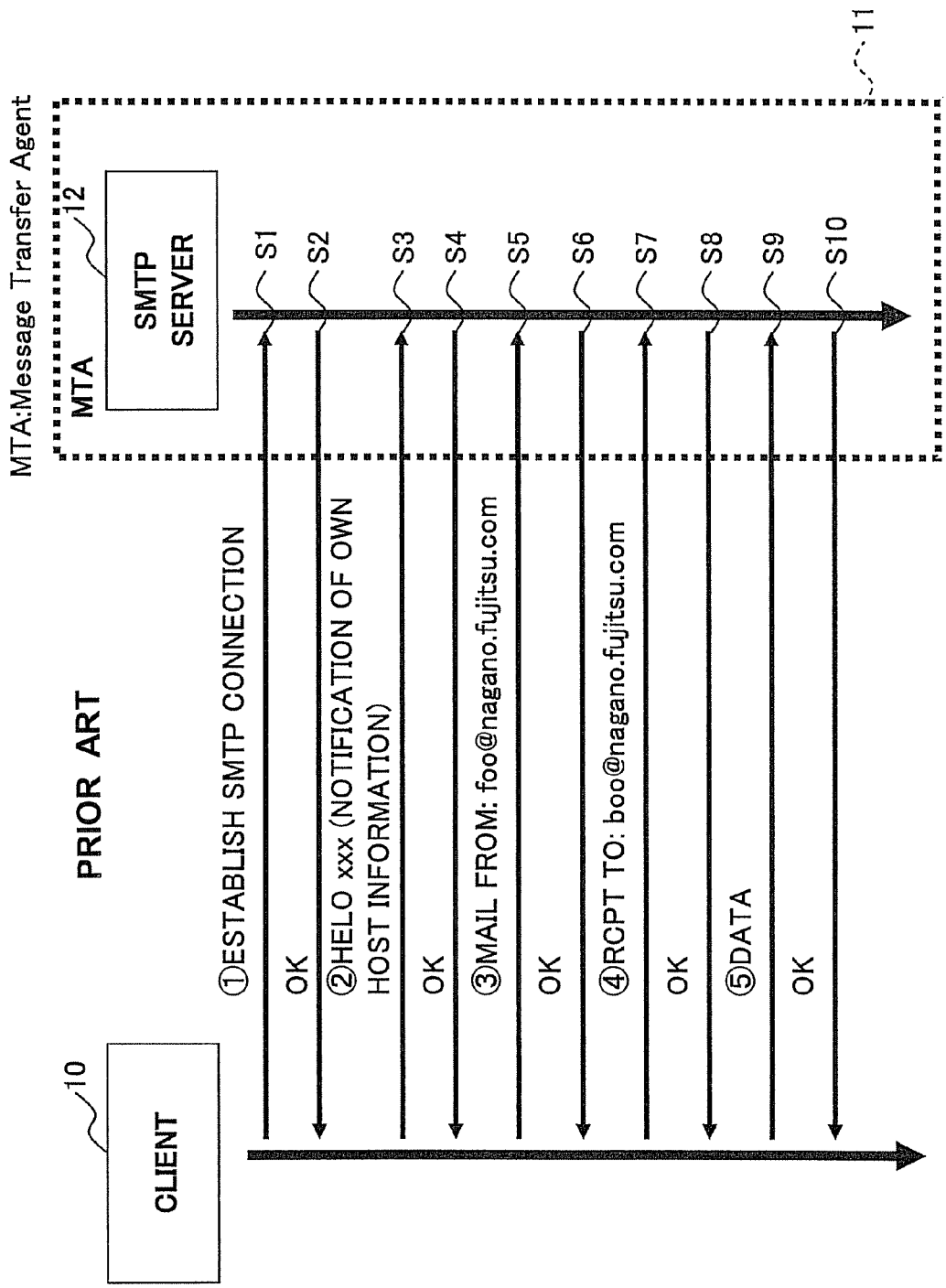

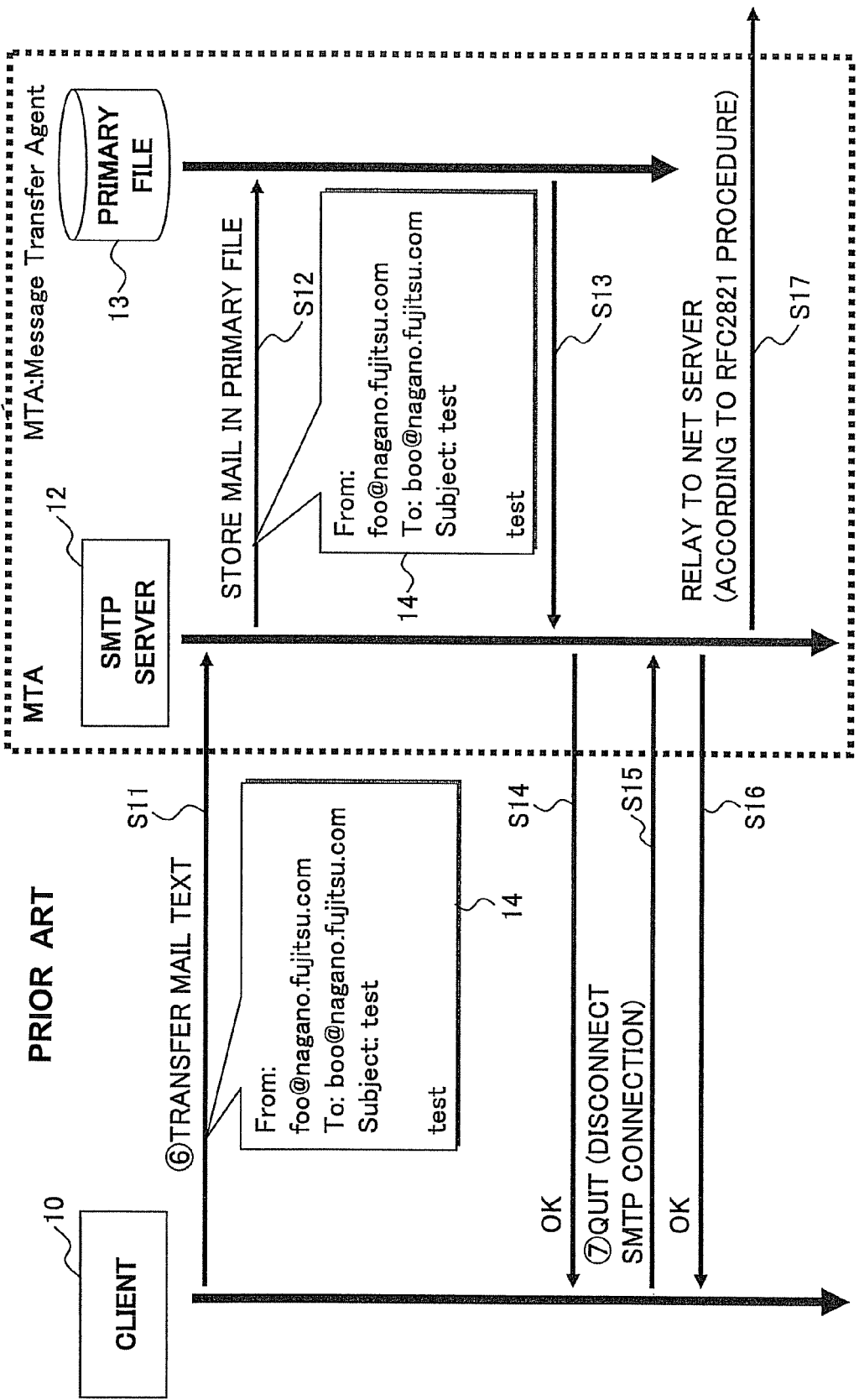

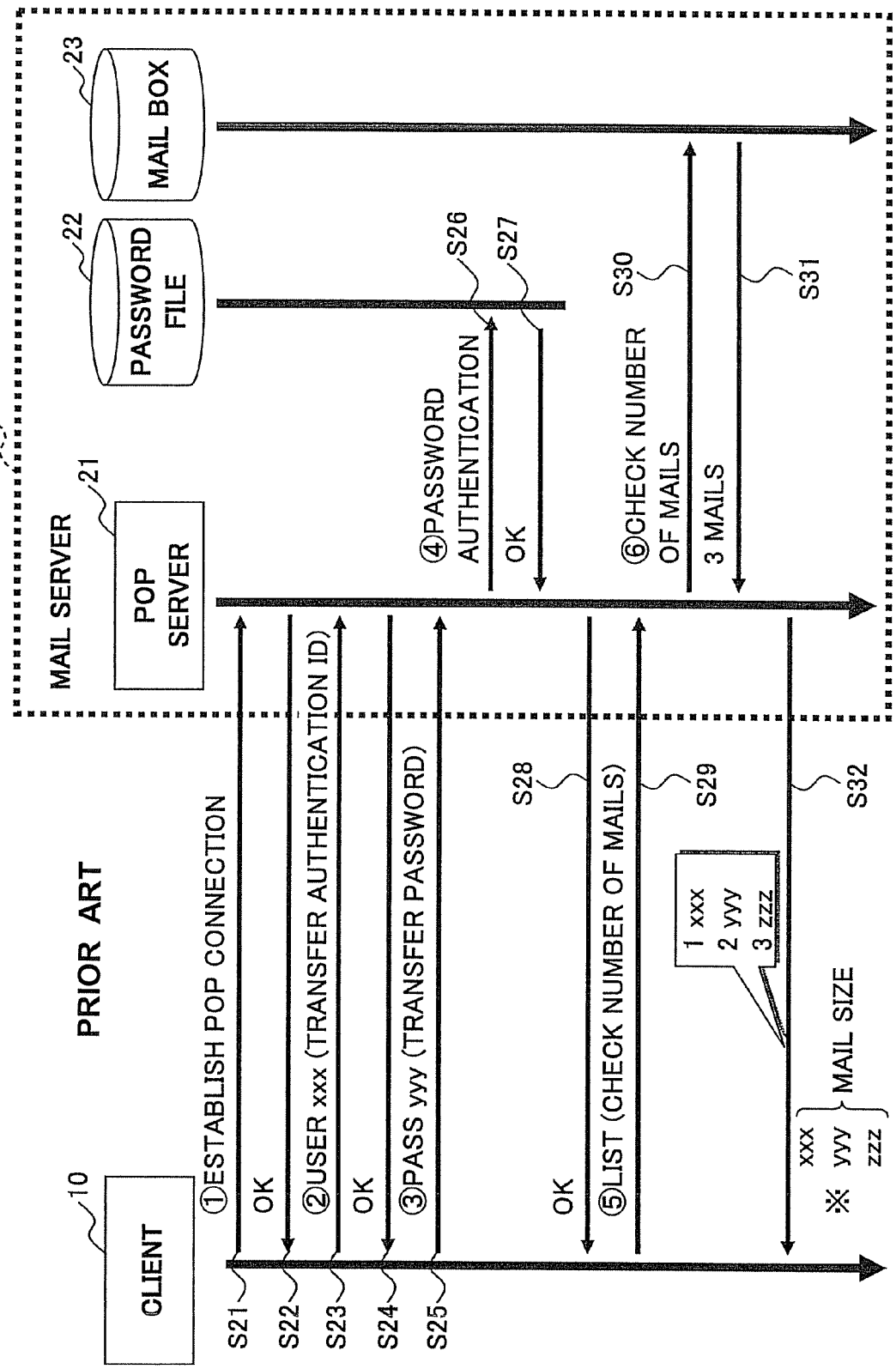

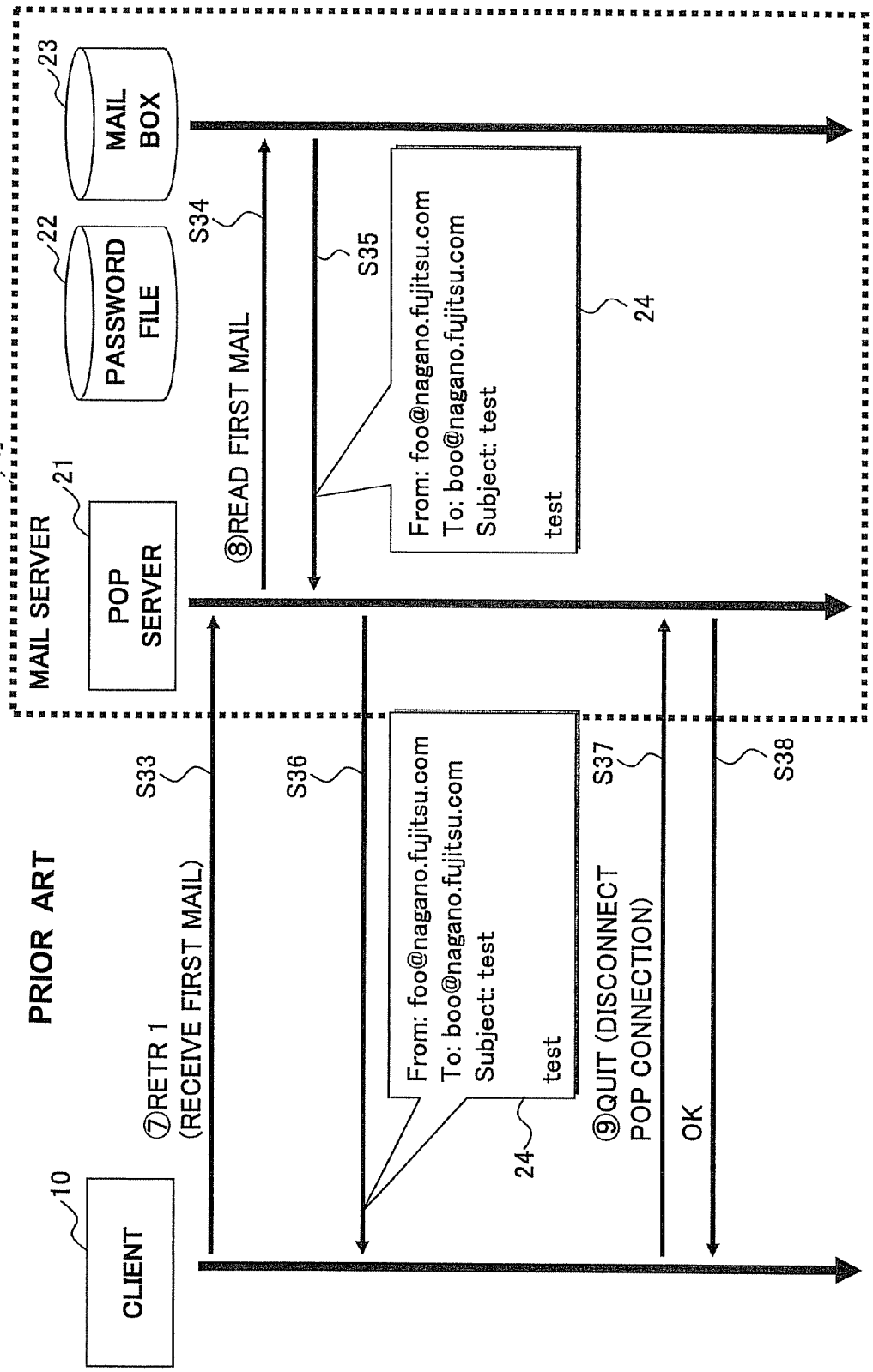

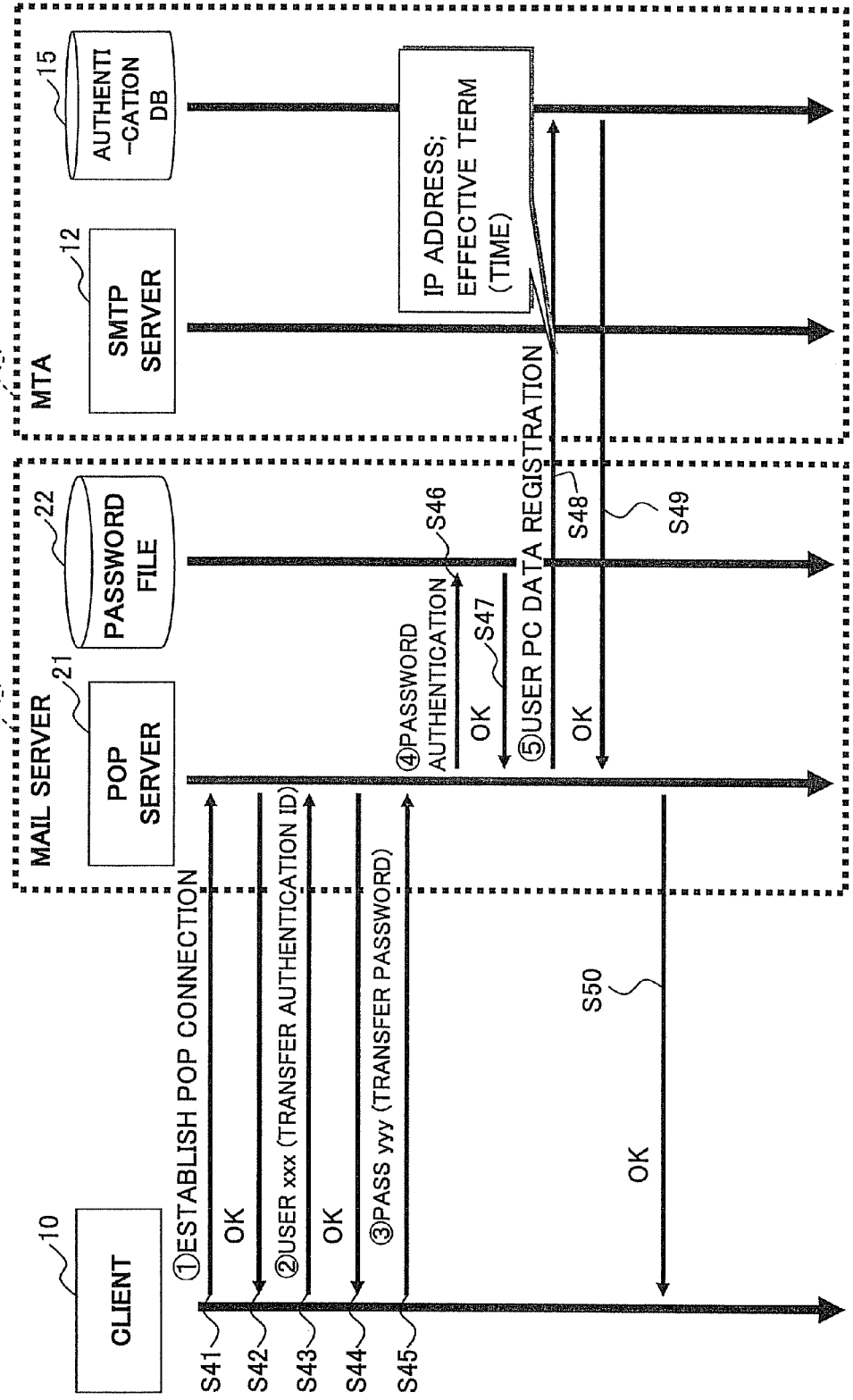

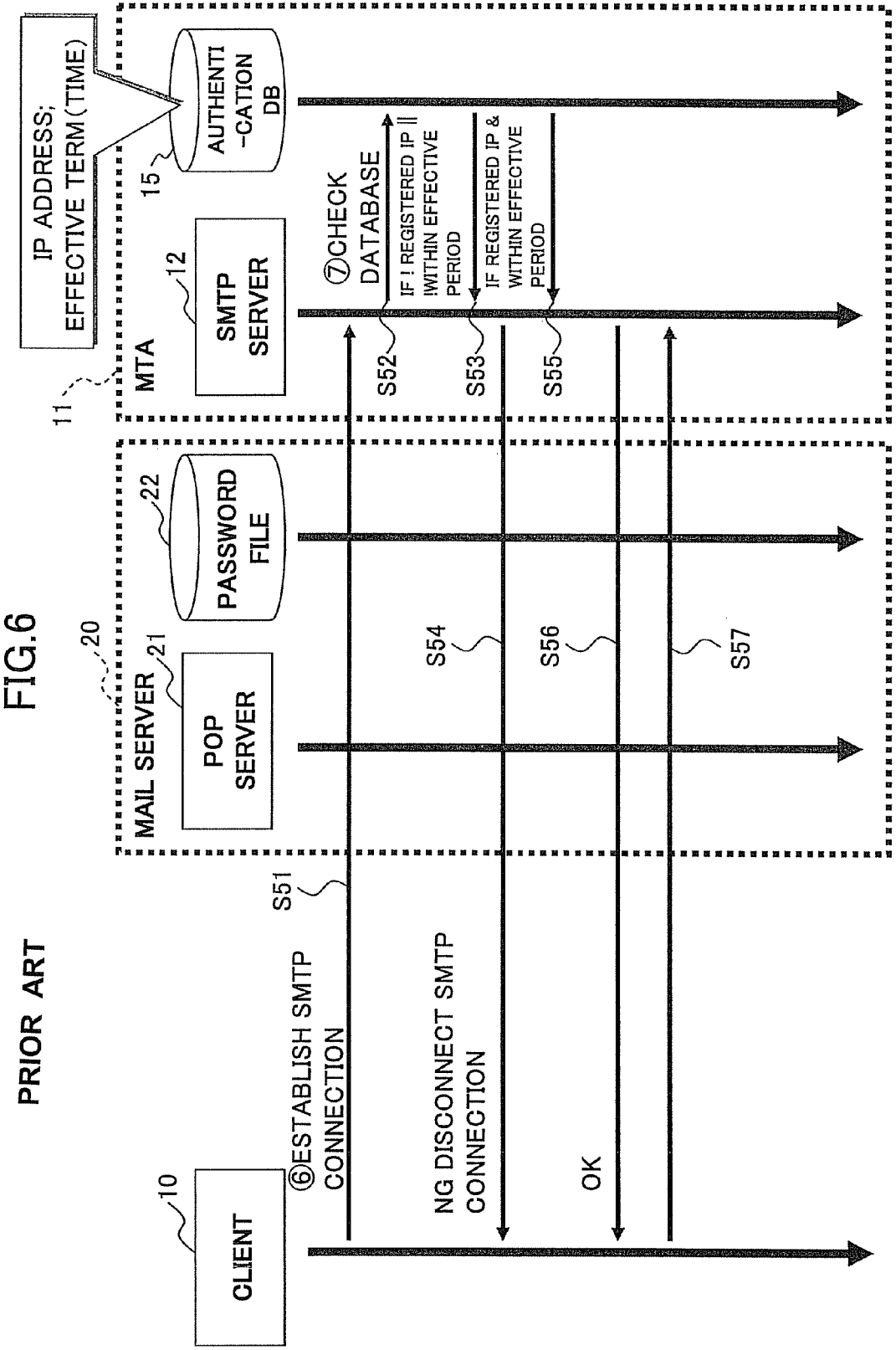

FIG.7

PRIOR ART

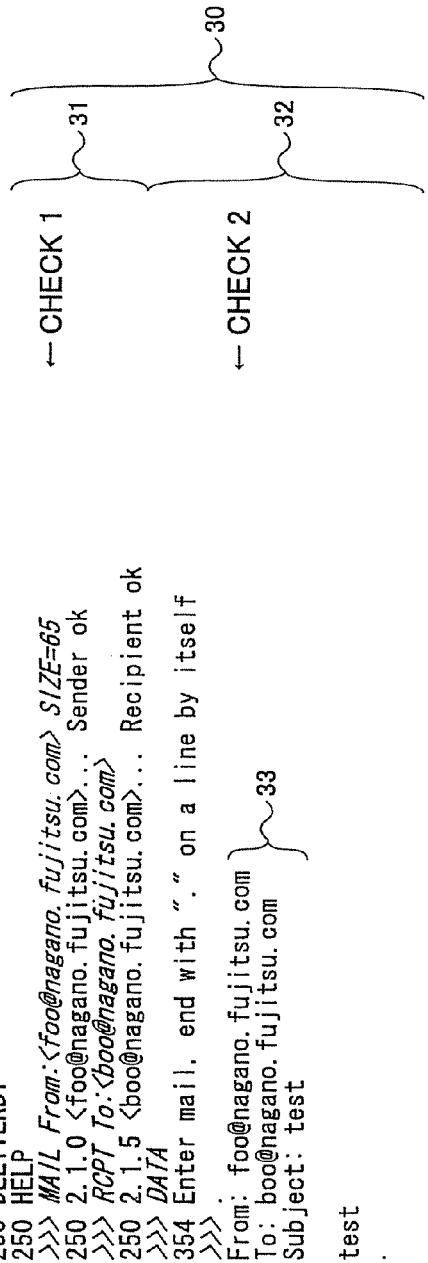

```
Connecting to s4-470.nagano.fujitsu.com. via smtp..
220 s4-470.nagano.fujitsu.com ESMTP Sendmail 8.12.9/3.7W; Fri, 4 Jul 2003 07:00:
01 +0900 (JST)
>>> EHLO matrix.nagano.fujitsu.com
250-s4-470.nagano.fujitsu.com Hello localhost [127.0.0.1], pleased to meet you
250-ENHANCEDSTATUSCODES
250-PIPELINING
250-EXPN
250-VERB
250-8BITMIME
250-SIZE
250-DSN
250-ETRN
250-DELIVERBY
250 HELP
>>> MAIL From:<foo@nagano.fujitsu.com> SIZE=65
250 2.1.0 <foo@nagano.fujitsu.com>... Sender ok                          ← CHECK 1
>>> RCPT To:<boo@nagano.fujitsu.com>
250 2.1.5 <boo@nagano.fujitsu.com>... Recipient ok
>>> DATA
354 Enter mail, end with "." on a line by itself
>>>
From: foo@nagano.fujitsu.com
To: boo@nagano.fujitsu.com  }33
Subject: test test
.

250 2.0.0 h63M01cU006242 Message accepted for delivery
rei@nagano.fujitsu.com... Sent (2.0.0 h63M01cU006242 Message accepted for delive
ry)                                                                       ← CHECK 2
Closing connection to s4-470.nagano.fujitsu.com.
>>> QUIT
221 2.0.0 s4-470.nagano.fujitsu.com closing connection
```

DATA TRANSMISSION METHOD, A DATA TRANSMISSION PROGRAM AND A DATA TRANSMISSION SERVER

BACKGROUND OF THE INVENTION

1. Field of the Invention

The present invention relates to data transmission techniques and, more particularly, to a data transmission method, a data transmission program and a data transmission server that transmits data received from a client to a destination terminal using a hierarchical protocol.

2. Description of the Related Art

For example, the E-mail service in the Internet is offered to users using a protocol such as SMTP (Simple Mail Transfer Protocol: RFC2821) or POP (Post Office Protocol v3: RFC1939). SMTP is a protocol which a client and a mail server use for transmitting an E-mail. POP is a protocol used by a client to receive an E-mail from a mail server.

Since SMTP is not provided with a user authentication function, unlawful access to a mail server (hereinafter, referred to as SMTP server) used when sending an E-mail is comparatively easy. For this reason, the SMTP server may be used for sending spam, etc. Moreover, since SMTP is not provided with a user's authentication function, it is difficult to eliminate a so-called "pretending" in which a person transmits an E-mail by pretending to be others.

In recent years, a technique referred to as "POP before SMTP" has been widely known as a technique to prevent an unjust use of E-mail by solving the above-mentioned trouble of SMTP. With this technique, an authentication of a user is performed by accessing a mail server (hereinafter, referred to as POP server), which is used when receiving an E-mail, so as to use an authentication function of the POP server. For example, an authentication ID and a password are used for a user authentication.

If the user authentication is in success, the POP server stores the IP address of the client in an authentication database (DB). If an E-mail from a client is received in this state, the SMTP server sends the E-mail to the destination address only when the IP address of the client who has sent the E-mail is stored in the authentication DB.

Japanese Laid-Open Patent Application No. 2002-251375 discloses a server which performs an authentication to eliminate the "pretending" so that a user can be identified in person. In order to identify the user, the server sends an identification code to the user who has been authenticated with an authentication ID and a password, and the user returns the identification code.

However, since the E-mail address of a user who sends an E-mail can be changed at the sender side, there is a problem in that the "pretending", in which someone sends an E-mail by pretending to be others, cannot be prevented completely even by the above-mentioned "POP before SMTP". In other words, there is a problem in that a user who sent an E-mail and an E-mail address cannot be correspond to each other on one-to-one basis even by the above-mentioned "POP before SMTP".

Moreover, there is method using an electronic certificate as a technique of causing a user who sent an E-mail and an E-mail address to correspond to each other on one-to-one basis. However, there is a problem that a cost is increased and a burden of management is increased since the method using an electronic certificate requires a mailer capable of using the electronic certificate, and all users must acquire and maintain the electronic certificate.

SUMMARY OF THE INVENTION

It is a general object of the present invention to provide an improved and useful data transmission method, data transmission program and data transmission server, in which the above-mentioned problems are eliminated.

A more specific object of the present invention is to provide a data transmission method, a data transmission program and a data transmission server that can cause identification information of a user who sent data and identification information of the user contained in the data to correspond to each other on one-to-one basis so as to prevent a person from transmitting data by pretending to be others.

In order to achieve that above-mentioned objects, there is provided according to one aspect of the present invention, a data transmission method of a data transmission server for transmitting data received from a client to a destination using a hierarchized protocol, wherein a first memory means stores client identification information for identifying the client and user identification information for identifying a user who operates the client, the client identification information and the user identification information being stored in correspondence to each other, the data transmission method comprising: determining whether the client identification information of the client which transmits the data and the user identification information of the user contained in a header part and a data part of the data are stored in the first memory means in correspondence to each other; and transmitting the data received from the client to the destination when the client identification information of the client which transmits the data and the user identification information of the user contained in a header part and a data part of the data are stored in the first memory means in correspondence to each other.

The above-mentioned data transmission method may further comprise: performing an authentication of the user by using a second memory means that stores user authentication information and the user identification information of the user who operates the client in correspondence to each other; and after completion of the authentication, storing in the first memory means the client identification information, the user identification information and effective term information.

Additionally, the data transmission method may further comprise: determining whether a record containing the client identification information is stored in the first memory means; determining whether the record stored in the first memory means is effective with reference to effective term information contained in the record; and determining whether the user identification information contained in the record that contains the client identification information matches the user identification information contained in the header part and the data part of the data.

In the above-mentioned data transmission method, the data received from the client may be transmitted to the destination when affirmative determinations are made that: the record containing the client identification information is stored in the first memory means; the record stored in the first memory means is effective with reference to effective term information contained in the record; and the user identification information contained in the record that contains the client identification information matches the user identification information contained in the header part and the data part of the data.

Further, in the above-mentioned data transmission method, the user identification information contained in the header part may be used by a protocol with respect to a predetermined layer, and the user identification information contained in the data part may be used by a protocol with respect to a layer higher than the predetermined layer.

Additionally, there is provided according to another aspect of the present invention a data transmission program for a computer that transmits data received from a client to a destination by using a hierarchized protocol, the data transmission program causing the computer to act as: memory means for storing client identification information for identifying the client and user identification information for identifying a user who operates the client, the client identification information and the user identification information being stored in correspondence to each other; determining means for determining whether the client identification information of the client which transmits the data and the user identification information of the user contained in a header part and a data part of the data are stored in the memory means in correspondence to each other; and transmitting means for transmitting the data received from the client to the destination when the client identification information of the client which transmits the data and the user identification information of the user contained in a header part and a data part of the data are stored in the memory means in correspondence to each other.

Further, there is provided according to another aspect of the present invention a data transmission server for transmitting data received from a client to a destination by using a hierarchized protocol, the data transmission server comprising: first memory means for storing client identification information for identifying the client and user identification information for identifying a user who operates the client, the client identification information and the user identification information being stored in correspondence to each other; first determining means for determining whether the client identification information of the client which transmits the data and the user identification information of the user contained in a header part and a data part of the data are stored in the first memory means in correspondence to each other; and transmitting means for transmitting the data received from the client to the destination when the client identification information of the client which transmits the data and the user identification information of the user contained in a header part and a data part of the data are stored in the first memory means in correspondence to each other.

According to the present invention, the client identification information and the user identification information of the user who operates the client are stored in the first memory means. Then, it is determined whether or not the client identification information of the client which transmits the data and the user identification information of the user contained in a header part and a data part of the data are stored in the first memory means in correspondence to each other. Thus, the data received from the client can be transmitted to the destination only when the client identification information of the client which transmits the data and the user identification information of the user contained in a header part and a data part of the data are stored in the first memory means in correspondence to each other. On the other hand, if the client identification information of the client which transmits the data and the user identification information of the user contained in a header part and a data part of the data are stored in the first memory means without corresponding to each other, the data received from the client can be prevented from being transmitted to the destination.

Other objects, features and advantages of the present invention will become more apparent from the following detailed description when read in conjunction with the accompanying drawings.

BRIEF DESCRIPTION OF THE DRAWINGS

FIG. 1 is an illustration for explaining an example of an E-mail transmission procedure that is compliant with SMTP;

FIG. 2 is an illustration for explaining the example of the E-mail transmission procedure that is compliant with SMTP;

FIG. 3 is an illustration for explaining an example of an E-mail reception procedure that is compliant with POP;

FIG. 4 is an illustration for explaining an example of an E-mail reception procedure that is compliant with POP;

FIG. 5 is an illustration for explaining an example of an E-mail transmission procedure that is compliant with POP before SMTP;

FIG. 6 is an illustration for explaining an example of an E-mail transmission procedure that is compliant with POP before SMTP;

FIG. 7 is an illustration for explaining character strings transmitted between a client and an SMTP server in an E-mail transmission procedure that is compliant with SMTP;

DETAILED DESCRIPTION OF THE PREFERRED EMBODIMENTS

Figure 8:
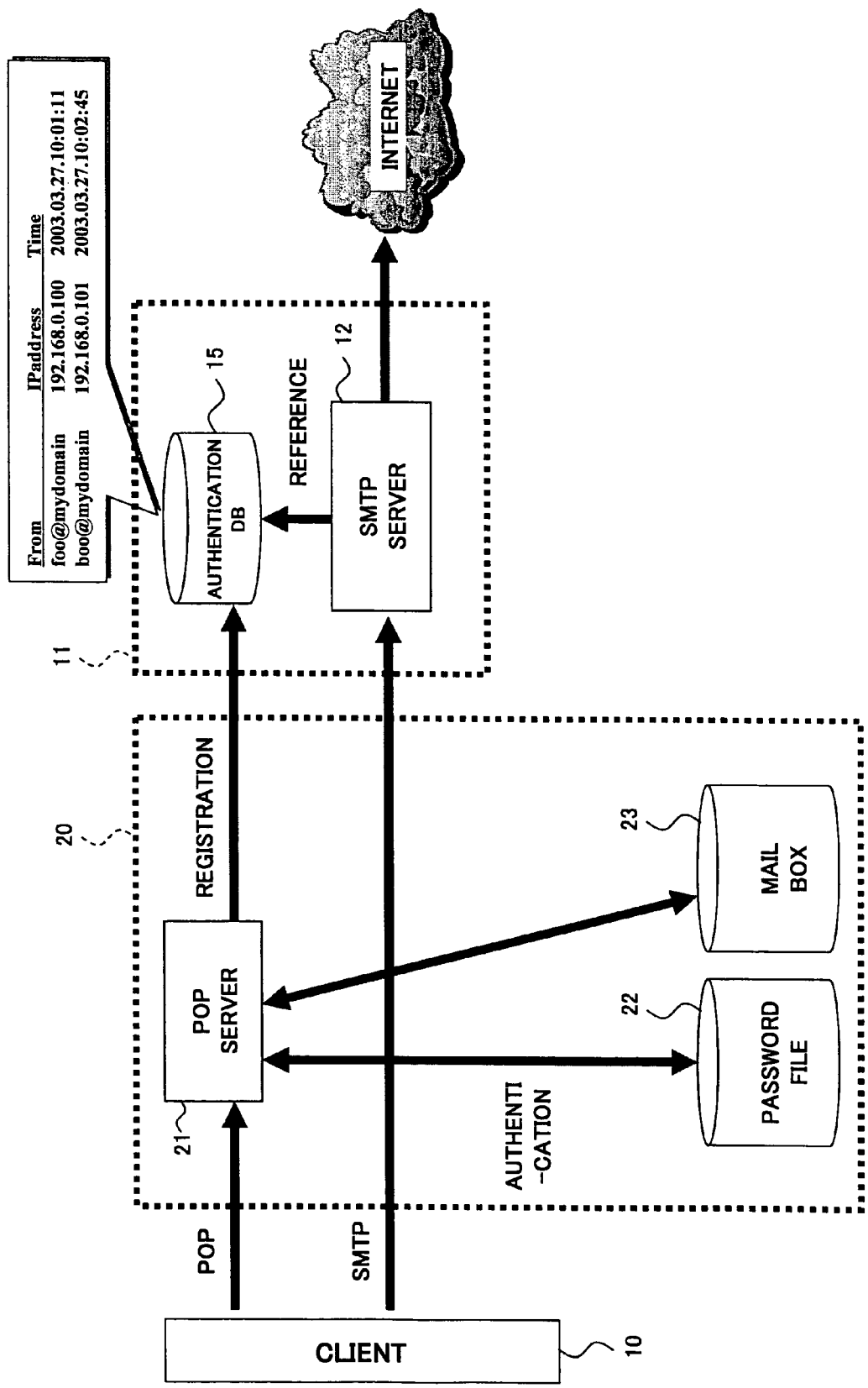
FIG. 8 is a diagram of an example of an E-mail system according to the present invention.

A description will now be given, with reference to the drawings, of an embodiment according to the present invention. It should be noted that although a description is given of an example in which an E-mail is sent from a client to a mail server as an example of sending data from a client to a data transmission server, the present invention is not limited to such an example.

First, a description will be given of an E-mail transmission procedure compliant with SMTP, an E-mail reception procedure compliant with POP, and an E-mail transmission procedure compliant with POP before SMTP ("3.3. Authorized Submission" of RFC2476 "Message Submission").

FIGS. 1 and 2 are illustrations for explaining an example of the E-mail transmission procedure that is compliant with SMTP. First, a user operates a mailer of a client 10 so as to produce an E-mail, and performs an operation to send the E-mail.

Proceeding to step S1, the client 10 requests establishment of an SMTP connection to an SMTP server 12 provided in a message transfer agent (hereinafter, referred to as MTA). Then, in step S2, the SMTP server 12 establishes the SMTP connection with the client 10, and sends to the client 10 an affirmative acknowledgement responding to the request of step S1.

Proceeding to step S3, the client 10 requests the SMTP server 12 to start communication. Then, in step S4, the SMTP server 12 performs preparation for starting communication, and sends to the client 10 an affirmative acknowledgement for responding to the request of step S3. Proceeding to step S5, the client 10 notifies the SMTP server 12 of the E-mail address of the sending side, which represents the sender of the E-mail. Then, in step S6, upon reception of notification of the E-mail address of the sending side, the SMTP server 12 sends to the client 10 an affirmative acknowledgement responding to the notification of step S5.

Proceeding to step S7, the client 10 notifies the SMTP server 12 of the E-mail address of the destination address which represents the receiver of the E-mail. Then, in step S8, upon receipt of the notification of the E-mail address of the destination, the SMTP server 12 sends to the client 10 an affirmative acknowledgement responding to the notification of step S7.

Proceeding to step S9, the client 10 requests the SMTP server 12 to start transmitting the text of the E-mail. Then, in step S10, the SMTP server 12 performs preparation of reception of the text of the E-mail, and sends to the client 10 an affirmative acknowledgement responding to the request of step S9.

Proceeding to step S11, the client 10 sends the text 14 of the E-mail to the SMTP server 12. In order to notify the SMTP server 12 of the completion of the transmission of the text 14 of the E-mail, the client 10 sends a period (.) alone at the end of the text 14 of the E-mail. Proceeding to step S12, the SMTP server 12 sequentially stores in the primary file 13 the text 14 of the E-mail which has been received from the client 10. Then, in step S13, the text 14 of the E-mail stored in the primary file 13 is read from the primary file 13 by the SMTP server 12 after completion of the reception. Proceeding to step S14, upon reception of the period alone, which indicates the end of the transmission, the SMTP server 12 sends to the client 10 an affirmative acknowledgement responding to notification of step S11.

Then, in step S15, the client 10 requests the SMTP server 12 to end the communication. Proceeding to step S16, the SMTP server 12 disconnects the SMTP connection established in step S2 after performing a preparation for ending the communication, and notifies the client 10 of the end of the communication. Then, in step S17, the SMTP server 12 transfers the E-mail to other SMTP servers or POP servers in accordance with the E-mail address of the destination notified in step S7. As mentioned above, in the transmission procedure of the E-mail compliant with SMTP, there is no authentication function provided for authenticating a sender.

FIGS. 3 and 4 are illustrations for explaining an example of the E-mail reception procedure that is compliant with POP. First, a user operates the mailer of the client 10 so as to perform an operation to receive an E-mail.

In step S21, the client 10 requests a POP server 21 provided in the to mail server 20 to establish a POP connection. Proceeding to step S22, the POP server 21 establishes the POP connection with the client 10, and sends to the client 10 an affirmative acknowledgement responding to the request of step S21.

Then, in step S23, the client 10 sends an authentication ID to the POP server 21. Upon receipt of the authentication ID, the POP server 21 sends, in step S24, to the client 10 an affirmative acknowledgement responding to the notification of step S23. Then, is step S25, the client 10 notifies the POP server 21 of a password. Upon receipt of the password, the POP server 21 sends, in step S24, to the client 10 an affirmative acknowledgement responding to the notification of step S24.

Proceeding to step S26, the POP server 21 performs a password authentication by collating the combination of the authentication ID and the password, which were sent in steps S23 and S25, with combinations of an authentication ID and a password of each of users who can use the electronic mail service, which are stored in a password file 22 as a record. It should be noted that the POP server 21 determines that the password authentication is in success if the combination of the authentication ID and the password, which were sent in steps S23 and S25, matches one of the combinations of the authentication ID and the password, which are stored in the password file 22 as a record.

Then, in step S27, the POP server 21 acquires a result of the collation of the combination of the authentication ID and the password, which were sent in steps S23 and S25, with the combinations of the authentication ID and the password, which are stored in the password file 22. If the password authentication is in success, the POP server 21 sends, in step S28, to the client 10 an affirmative acknowledgement responding to the notification of steps S23 and S25.

Then, in step S29, the client 10 requests the POP server 21 to check a number of E-mails. Proceeding to step S30, the POP server 21 requests a mail box 23 to check the number of E-mails. Then in step S31, the POP server 21 receives a notification from the mail box 23 about the number of E-mails addressed to a user whose password authentication was in success. FIG. 3 shows an example where the number of E-mails addressed to the user is three.

Proceeding to step S32, the POP server 21 sends to the client 10 the number of E-mails addressed to the user and the size of each of the E-mails. Then, in step S33, the client 10 requests the POP server 21 to send a first E-mail. In step S34, the POP server 21 requests the mail box 23 to read out the first E-mail. Proceeding to step S35, the POP server 21 receives the first E-mail 24, which was read from the mail box 23.

Then, in step S36, the POP server 21 sends the first E-mail 24 received from the mail box 23. After receiving the first E-mail 24, the client 10 requests, in step S37, the POP server 21 to end the communication. Then, in step S38, the POP server 21 disconnect the POP connection established in step S21 after performing a preparation for ending the communication, and sends to the client 10 a notification of end of communication. As mentioned above, in the E-mail reception procedure that is compliant with POP, the authentication function is provided for authenticating a receiver.

A description will be given below of an E-mail transmission procedure that is compliant with "POP before SMTP" for solving the trouble of SMTP due to lack of a user authentication function. FIGS. 5 and 6 are illustrations for explaining an example of the E-mail transmission procedure that is compliant with POP before SMTP. It should be noted that the a part of the process of FIGS. 5 and 6 is the same as a part of the process of FIGS. 1 and 2 or FIGS. 3 and 4, and descriptions there of may will be omitted for the sake of simplification.

The process of steps S41 through S47 is the same as the process of steps 21 through S27 of FIG. 3, and descriptions thereof will be omitted. If the password authentication is successful in step S47, the POP server 21 stores, in step S48, the IP address of the client 10 and a predetermined effective term in an authentication database (hereinafter, referred to as authentication DB) 15 provided in the message transfer agent (MTA) 11. Then, in step S49, the POP server 21 is notified of the fact that the IP address of the client 10 and the predetermined effective term are stored in the authentication DB 15.

Proceeding to step S50, if the password authentication is successful, the POP server 21 sends to the client 10 an affirmative acknowledgement responding to the notification of steps S23 and S25. Then, in step S51, the client 10 requests the SMTP server 12 provided in the MTA 11 to establish an SMTP connection.

Proceeding to step S52, the SMTP server 12 checks whether or not the IP address of the client 10, which the SMTP server 12 has requested to establishment the SMTP connection in step S51, is stored in the authentication DB 15. Additionally, if the IP address of the client 10, which the SMTP server 12 has requested to establishment the SMTP connection in step S51, is stored in the authentication DB 15, the SMTP server 12 acquires the effective term corresponding to the IP address and checks whether it is within the effective term.

If the IP address of the client 10, which the SMTP server 12 has requested to establishment the SMTP connection in step S51, is not stored in the authentication DB 15, or if it is determined that it is not within the effective term, the routine proceeds to step S54 following to step S53. In step S54, the SMTP server 12 disconnects the SMTP connection and sends to the client 10 a negative acknowledgement responding to the request of step S51.

If the IP address of the client 10, which the SMTP server 12 has requested to establishment the SMTP connection in step S51, is stored in the authentication DB 15, and if it is determined that it is within the effective term, the routine proceeds to step S56 following to step S55. In step S56, the SMTP server 12 establishes the SMTP connection with the client 10 and sends to the client 10 an affirmative acknowledgement responding to the request of step S51.

It should be noted that the process of step S57 is the same as the process of steps S2 through S17, and descriptions thereof will be omitted. As mentioned above, in the E-mail transmission procedure that is compliant with "POP before SMTP", the IP address of the client 10 whose password authentication is successful in POP is stored in the authentication DB 15, and the E-mail is transmitted to the destination only when the IP address of the client 10 who has sent the E-mail is stored in the authentication DB.

However, it is difficult to completely prevent the "pretending", in which an E-mail is transmitted by pretending to be others, even by the E-mail transmission procedure that is compliant with "POP before SMTP" for the following reason.

FIG. 7 is an illustration for explaining character strings transmitted between a client and an SMTP server in the E-mail transmission procedure that is compliant with SMTP. A character string set 30 of FIG. 7 represents data in the Internet layer, and consists of a header part 31 and a data part 32. It should be noted that the header part 31 may be referred to as an envelope. The data part 32 represents data in an application layer.

The header part 31 contains an E-mail address (foo@nagano.fujitsu.com) of the sender side, which is transferred from the client 10 to the SMTP server 12 in steps S5 and S7 of FIG. 1, and an E-mail address (boo@nagano.fujitsu.com) of the destination. Moreover, the data part 32 contains the text 14 of the E-mail, which is transferred from the client 10 to the SMTP server 12 in step S11 of FIG. 1.

The text 14 of the E-mail contains the header part 33 used in the application layer. The header part 33 contains an E-mail address (foo@nagano.fujitsu.com) of the sender side, which is used by a mailer, for example, and an E-mail address (boo@nagano.fujitsu.com) of the destination.

In the E-mail transmission procedure compliant with SMTP, a data transmission is performed with reference to only the header part 31 in the Internet layer. That is, when transferring the E-mail from the SMTP server to other SMTP servers or POP servers, the E-mail address (foo@nagano.fujitsu.com) of the sender side, which is used in the application layer, and the E-mail address (boo@nagano.fujitsu.com) of the destination are not referred to at all.

Accordingly, even if the E-mail address of the sender side and the E-mail address of the destination in the header part 31 are different from the E-mail address of the sender side and the E-mail address of the destination in the header part 33, the SMTP server 12 transfers the E-mail to other SMTP servers or POP servers according to an ordinary procedure. Applications such as a mailer displays the E-mail address of the sender side and the E-mail address of the destination in the header part 33 as the E-mail address of the sender side and the E-mail address of the destination so as to receive only the data part 32 in the Internet layer as data in the application layer.

Therefore, if a malice user produces and transmits an E-mail in which the E-mail address of the sender side and the E-mail address of the destination in the header parts 31 and 33 are different, it is possible to perform the "pretending", in which an E-mail is transmitted by pretending to be others, even by the E-mail transmission procedure compliant with "POP before SMTP".

However, according to the embodiment of the present invention, at least the sender of the first E-mail (a mail address of the sender side contained in the header part 31) and the E-mail address of the sender side (a mail address of the sender side contained in the header part 33) can be corresponded on one-to-one basis by solving the above-mentioned problem in the E-mail transmission procedure compliant with "POP before SMTP".

FIG. 8 is a diagram of an example of an E-mail system according to the present invention. The E-mail system of FIG. 8 comprises the client 10, which a user uses to transmit or receive an E-mail, the mail server 20 and MTA 11.

The client 10 performs transmission or reception of an E-mail according to the E-mail transmission procedure compliant with "POP before SMTP" or the E-mail reception procedure compliant with POP. The mail server 20 comprises the POP server 21, the password file 22 and the mail box 23. The MTA 11 comprises the SMTP server 12 and the authentication DB 15.

It should be noted that a part of the structure that is not necessary to describe is omitted in FIG. 8 for the sake of simplification. Moreover, although the MTA 11 and the mail server 20 are included separately in the structure of FIG. 8, the function of the MTA 11 and the mail server 20 may be achieved by one server or a plurality of servers. The MTA 11 and the mail server 20 are constituted as shown in FIG. 9.

Figure 9:
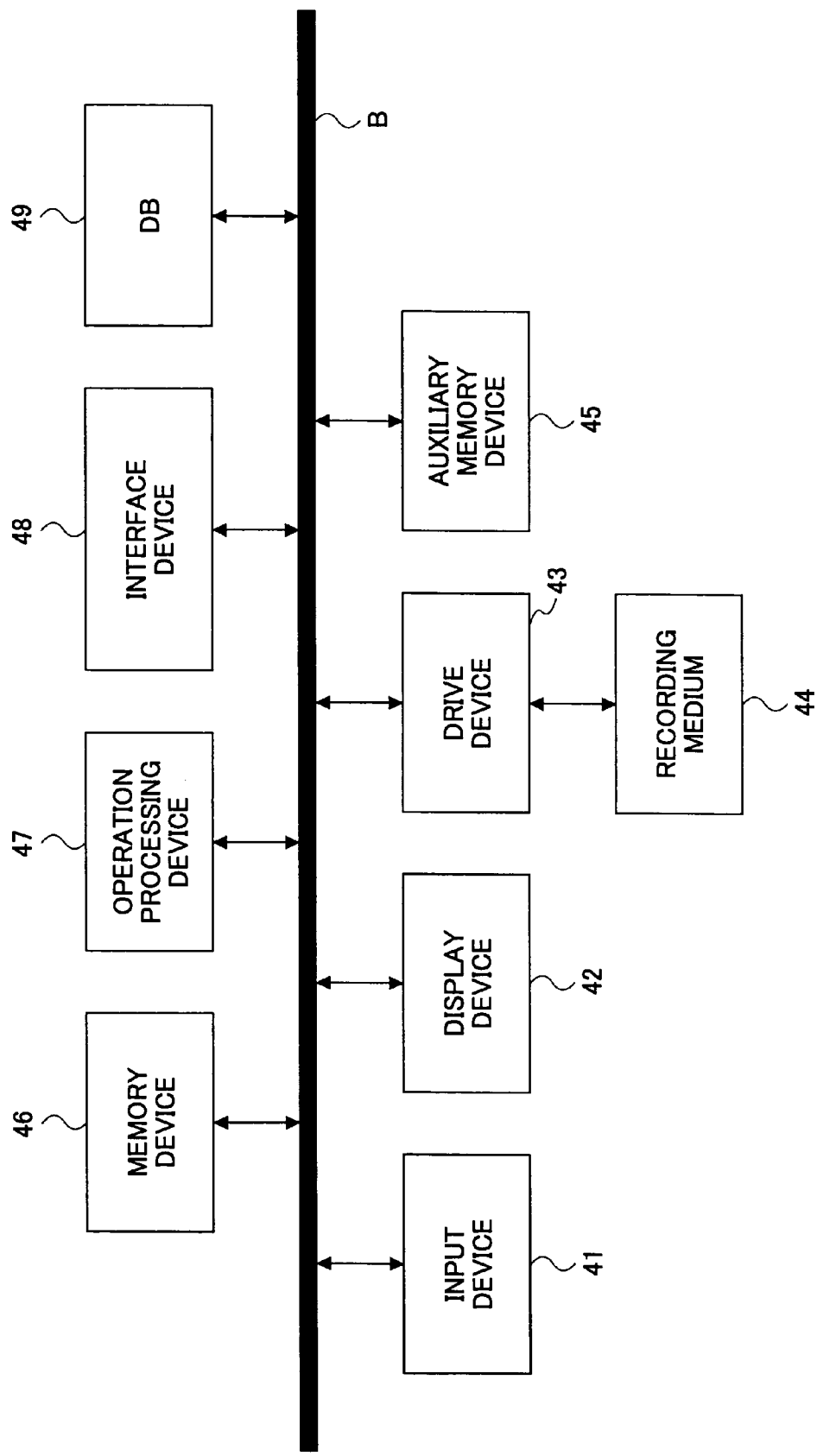
FIG. 9 is a block diagram of an example of a computer which realizes a mail server or an message transfer agent.
Figure 10:
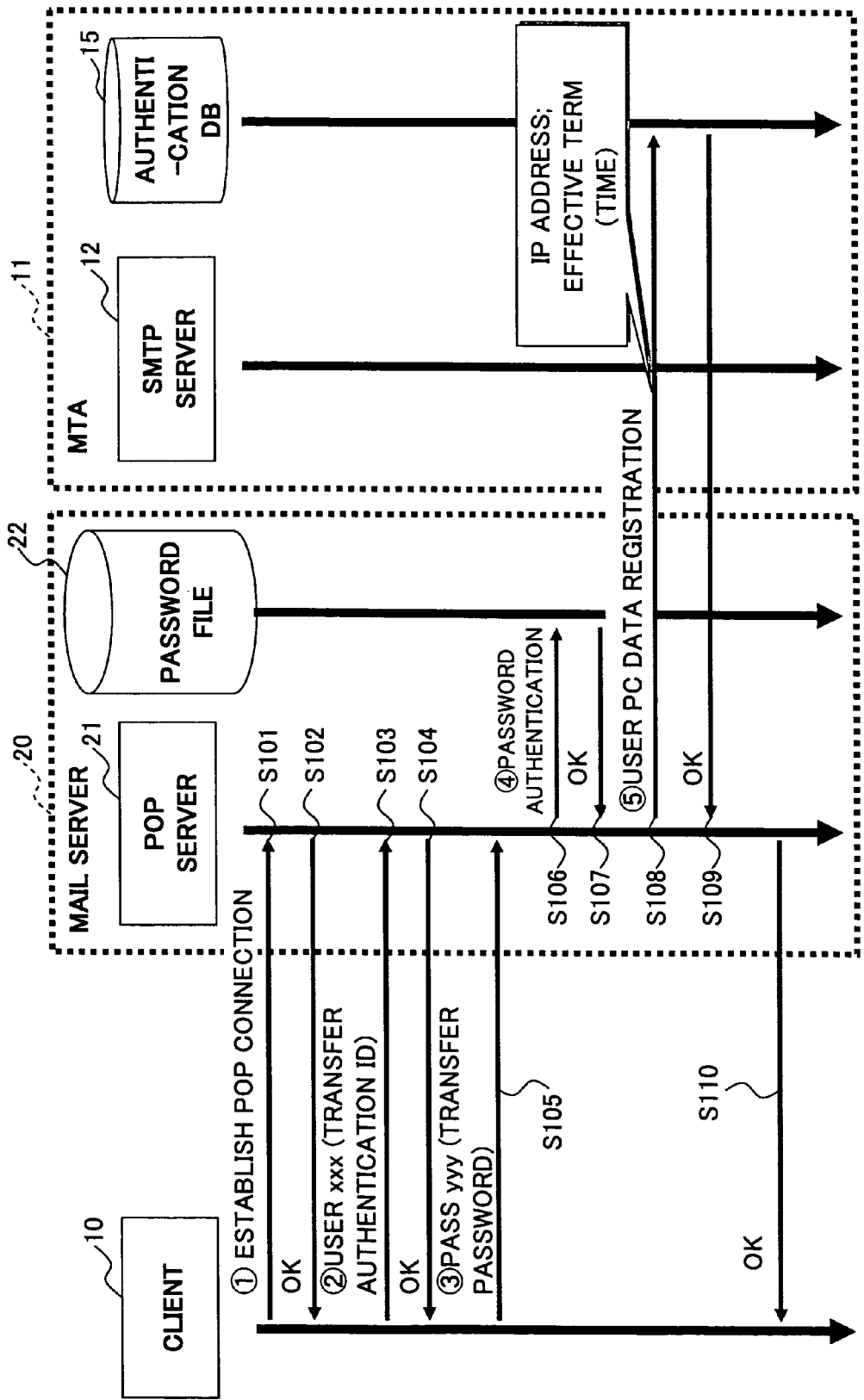
FIG. 10 is a flow diagram for explaining an example of an E-mail transmission procedure according to the present invention.
Figure 11:
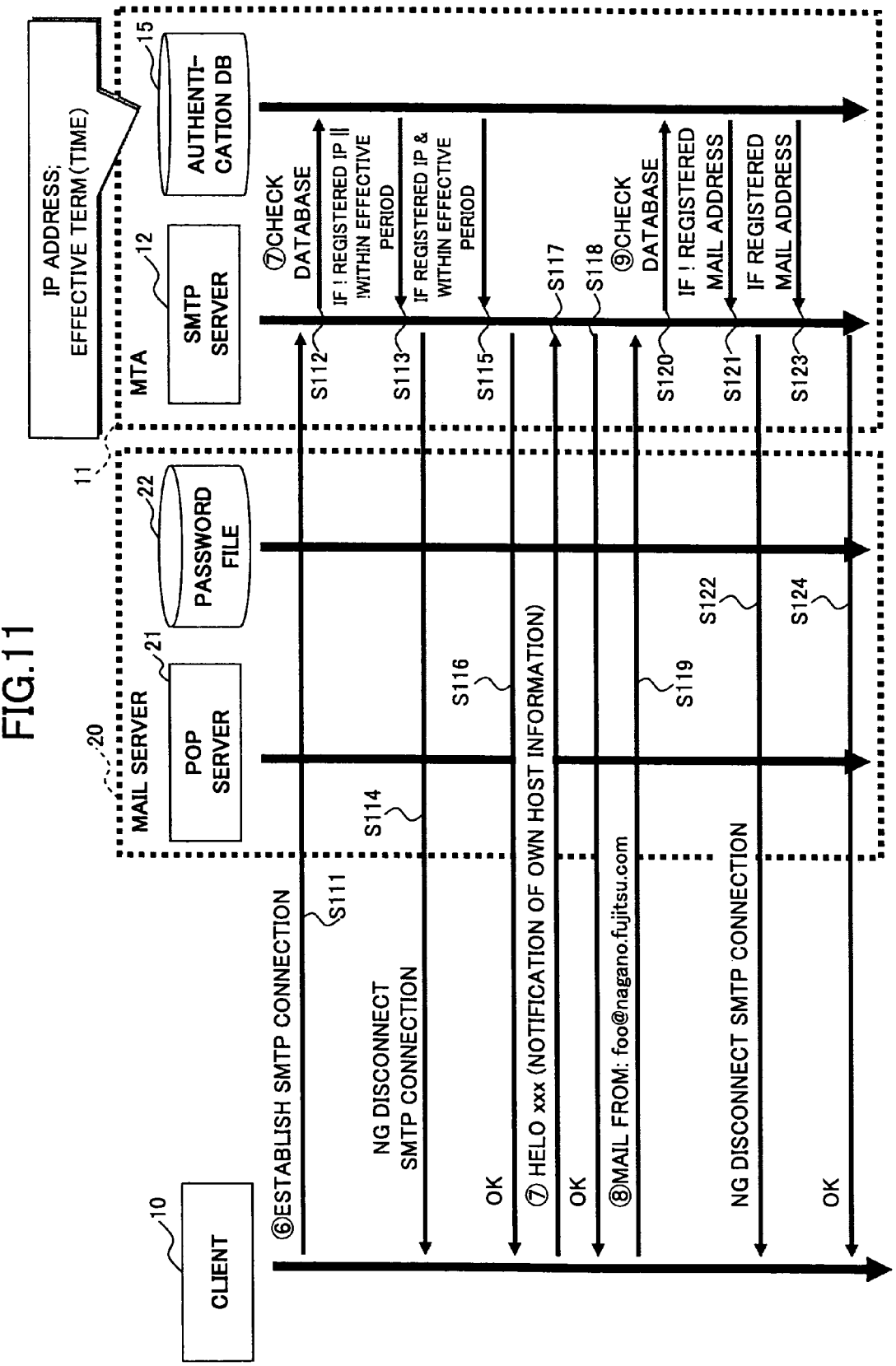
FIG. 11 is a flow diagram for explaining an example of an E-mail transmission procedure according to the present invention.
Figure 12:
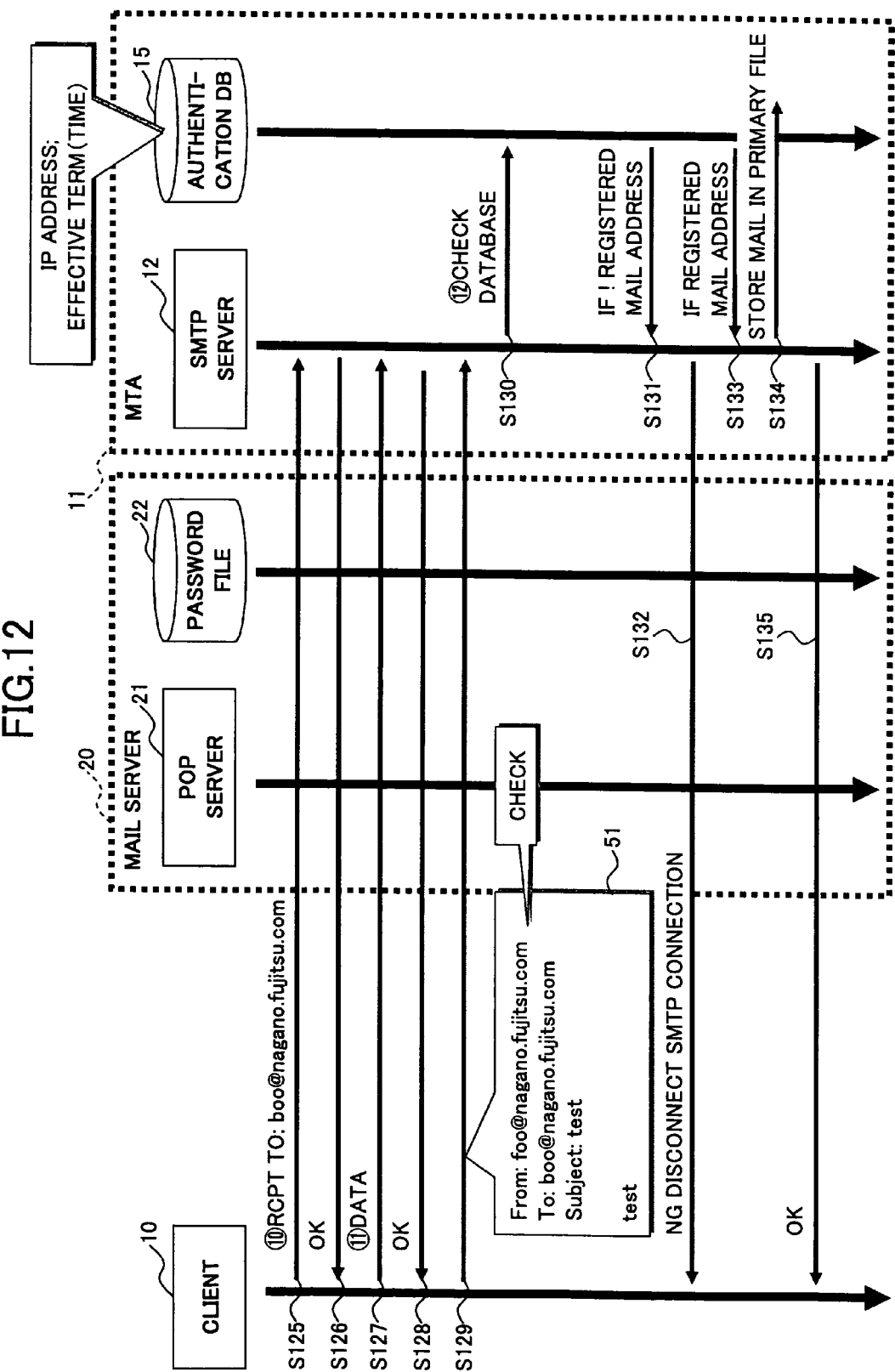
FIG. 12 is a flow diagram for explaining an example of an E-mail transmission procedure according to the present invention.
Figure 13:
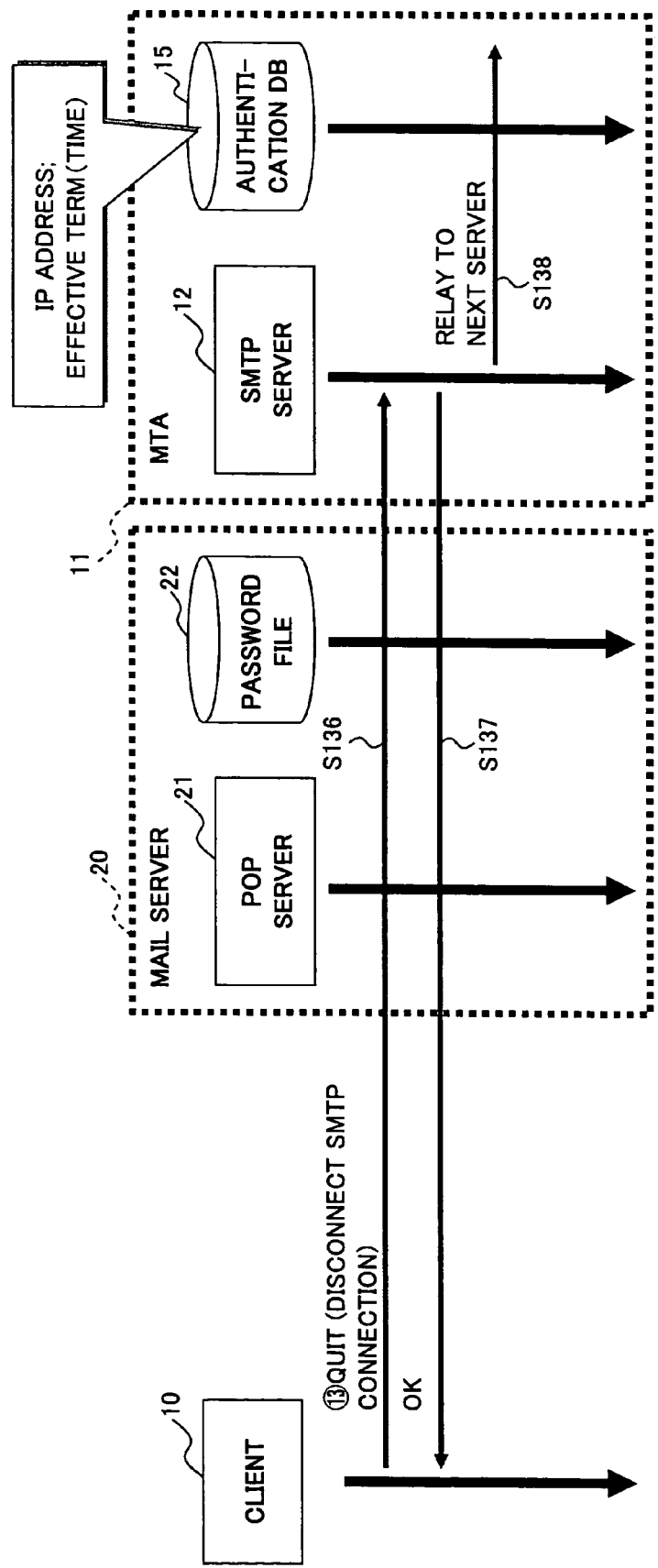
FIG. 13 is a flow diagram for explaining an example of an E-mail transmission procedure according to the present invention.

FIG. 9 is a block diagram of an example of a computer which realizes the mail server or the MTA. The computer shown in FIG. 9 comprises an input device 41, a display device 42, a drive device 43, a recording medium 44, an auxiliary memory device 45, a memory device 46, an operation processing device 47, an interface device 48, and a data base (hereinafter, referred to azs DB) 49, which are mutually connected by a bus B.

The input device 41 is constituted by a keyboard, a mouse, etc., and is used to input various operation signals. The display device 42 is constituted by a display device, etc., and is used to display various windows, data, etc. The interface device 48 is constituted by a modem, a terminal adapter, etc., and is used to connect with a network such as the Internet. The DB 49 stores various kinds of information required for performing transmission and reception process of E-mail.

Programs relates to transmission and reception of E-mail are provided by distribution of the recording medium or downloading from the network. It should be noted that a various types of recording media can be used as the recording medium 44, such as a recoding medium that optically or magnetically records information such as a CD-ROM, a flexible disk, or magneto-optical disk (MO) or a semiconductor memory that electrically records information such as a ROM or a flash memory.

When the recording medium 44 is set in the drive device 43, programs are read from the recording medium 44 by the drive device 43 and are installed in the auxiliary memory device 45. On the other hand, programs downloaded through the Internet are installed in the auxiliary memory device 45 through the interface device 48.

The auxiliary memory device 45 stores the installed programs, and also stores necessary files and data, etc. The memory device 46 reads programs from the auxiliary memory device 45 and stores the progrmas therein when the computer is starts to operate. The operation processing device 47 realizes various functions of the E-mail system according to the programs stored in the memory device 46.

A description will be given below of an E-mail transmission procedure according to the present invention. FIGS. 10 through 13 are flow diagrams for explaining an example of the E-mail transmission procedure according to the present invention. Since a part of the process of FIGS. 10 through 13 is the same as a part of the process of FIGS. 5 and 6, and descriptions thereof will be omitted.

The process of steps S101 through S107 is the same as the process of steps S41 through S47 of FIG. 5, and descriptions thereof will be omitted. If the password authentication is successful in step S107, the POP server 21 stores, in step S108, the IP address of the client 10 and the E-mail address of the user, which is uniquely determined by the authentication ID and the password notified in step S23 and S25, in the authentication DB 15 provided in the MTA 11 by relating them to the predetermined effective term.

It should be noted that the E-mail address of the user, which is uniquely determined by the authentication ID and the password notified in the steps S23 and S25, are acquired from the password file 22 as a static database or a dynamic database represented by a LDAP (Lightweight Directory Access Protocol). The password file 22 stores authentication IDs, passwords and E-mail addresses of users being uniquely corresponded to each other.

A combination of the IP address of the client 10 stored in the authentication DB15, an E-mail of the user, and a predetermined effective term is stored in the authentication DB 15 for at least a period corresponding to the effective term. Proceeding to step S109, the POP server 21 receives a notification of the fact that the IP address of the client 10, the E-mail of the user, and the predetermined effective term are stored in the authentication DB 15.

The process of steps S110 through S116 is the same as the process of steps S50 through S56 of FIGS. 5 and 6, and descriptions thereof will be omitted. Additionally, the process of steps S117 and S118 is the same as the process of steps S3 and S4 of FIG. 1, and descriptions thereof will be omitted.

Proceeding to step S119, the client 10 notifies the SMTP server 12 of the E-mail address of the sender side that represents the sender of the E-mail. Then, in step S120, the SMTP server 12 checks whether or not the IP address of the client 10 who requested the establishment of the SMTP connection in step S11 and the E-mail address of the sender side that was notified in step S119 are stored in the authentication DB 15 in correspondence to each other.

If it is confirmed that the IP address of the client 10, which has requested to establish the SMTP connection in step S111, and the E-mail address of the sender side notified in step S119 are stored in the authentication DB 15 without corresponding to each other, the routine proceeds to step S122 subsequent to step S121. In step S122, the SMTP server 12 disconnects the SMTP connection and sends to the client 10 a negative acknowledgement responding to the request of step S111.

On the other hand, if it is confirmed that the IP address of the client 10, which has requested to establish the SMTP connection in step S111, and the E-mail address of the sender side notified in step S119 are stored in the authentication DB 15 in correspondence to each other, the routine proceeds to step S124 subsequent to step S123. In step S124, the SMTP server 12 establish the SMTP connection and sends to the client 10 an affirmative acknowledgement responding to the request of step S111. The process of steps S125 through S129 is the same as the process of steps S7 through S11 of FIGS. 1 and 2, and descriptions thereof will be omitted.

Proceeding to S130, the SMTP server 12 acquires the header part 33 used in the application layer from the text 51 of the E-mail received from the client 10 in step S129, and reads the E-mail address (foo@nagano.fujitsu.com) of the sender side from the header part 33.

Then, in step S130, the SMTP server 12 checks whether or not the IP address of the client 10 which requested to establish the SMTP connection in step S111 and the E-mail address of the sender side acquired from the header part 33 in step 129 are stored in the authentication DB 15 in correspondence to each other.

If it is confirmed that the IP address of the client 10 which requested to establish the SMTP connection in step S111 and the E-mail address of the sender side acquired from the header part 33 in step 129 are stored in the authentication DB 15 without corresponding to each other, the routine proceeds to step S132 subsequent to step S131. In step 132, the SMTP server 12 disconnects the SMTP connection and sends to the client 10 a negative acknowledgement responding to the request of step S111.

On the other hand, if it is confirmed that the IP address of the client 10 which requested to establish the SMTP connection in step S111 and the E-mail address of the sender side acquired from the header part 33 in step 129 are stored in the authentication DB 15 in correspondence to each other, the routine proceeds to step S134 subsequent to step S133. In step 134, the SMTP server 12 stores the text 14 of the E-mail received from the client 10 in the primary file 13.

Then, proceeding to step S135, upon receipt of a notification of ending the transmission of the text 14 of the E-mail by a line containing only a period, the SMTP server 12 sends to the client 10 an affirmative acknowledgement responding to the request of step S111. In step S136, the client 10 requests the SMTP server 12 to end the communication. Then, in step S137, after performing a preparation of ending the communication, the SMTP server 12 disconnects the SMTP connection established in step S111 and notifies the client 10 of the end of the communication. Proceeding to step S138, the SMTP server 12 transfer the E-mail to other SMTP servers or POP servers in accordance with the E-mail address of the destination received in step S125.

As mentioned above, according to the E-mail transmission procedure according to the present invention, the "pretending" can be more effectively prevented than the E-mail transmission procedure compliant with "POP before SMTP" since all of the collation according to the IP address of the client 10, the collation according to the effective term information and the collation according to the E-mail address of the sender side contained in the header part 31 and the data part 32 are used.

Consequently, the sender and the E-mail address of the sender side of at least first E-mail transmitted by the SMTP server 12 can be corresponded to each other on one-to-one basis. Thus, in an operation in an enterprise, for example, a sender and an E-mail address of a sender side of an E-mail can be corresponded to each other on one-to-one basis until the E-mail is transmitted to outside parties, which can clarify a fact relevance in a situation, for example, where a lawsuit against arrogation is filed by a third party.

Although the process of steps S101 through S107 is compliant with "POP before SMTP" in the above-mentioned embodiment, the same procedure can be applied to a case where a process compliant with "SMTP Service Extension for Authentication (RFC2476)" so as to achieve the E-mail transmission procedure according to the present invention.

Moreover, the example of transmitting an E-mail from a client to a mail server was described as an example of transmitting data from a client to a mail server in the above-mentioned embodiment, the present invention is not limited to a protocol relating to an E-mail and is applicable to all protocols that can make authentications on various kinds of protocols into a database by linking information on the Internet layer with information in an application layer.

The present invention is not limited to the specifically disclosed embodiments, and variations and modifications may be made without departing from the scope of the present invention.

The present application is based on Japanese priority application No. 2003-280933 filed Jul. 28, 2003, the entire contents of which are hereby incorporated by reference.

What is claimed is:

1. A data transmission method of a data transmission server for transmitting data received from a client to a destination, wherein a first memory means stores client identification information and user identification information uniquely determined by authentication ID and password authenticated by Post Office Protocol (POP) in correspondence to each other, the data transmission method comprising:
   determining whether the client identification information of the client which transmits the data and sender user identification information are stored in said first memory means in correspondence to each other; and
   controlling not to transmit the data received from said client to the destination when the determining determines that the client identification information of the client which transmits the data and the sender user identification information of the sender user contained in a data part of the data are not stored in said first memory means in correspondence to each other.

2. The data transmission method as claimed in claim 1, further comprising:
   performing an authentication of said user by using a second memory means that stores user authentication information and the user identification information of the user who operates said client in correspondence to each other; and
   after completion of the authentication, storing in said first memory means the client identification information, the user identification information and effective term information.

3. The data transmission method as claimed in claim 2, further comprising:
   determining whether a record containing the client identification information is stored in said first memory means;
   determining whether the record stored in said first memory means is effective with reference to effective term information contained in the record; and
   determining whether the user identification information contained in the record that contains the client identification information matches the user identification information contained in a header part and the data part of the data.

4. The data transmission method as claimed in claim 3, wherein
   the data received from said client is transmitted to the destination when affirmative determinations are made that: the record containing the client identification information is stored in said first memory means;
   the record stored in said first memory means is effective with reference to effective term information contained in the record; and
   the user identification information contained in the record that contains the client identification information matches the user identification information contained in the header part and the data part of the data.

5. The data transmission method as claimed in claim 1, wherein a header part contains the user identification information, and the user identification information contained in said header part is used by a protocol with respect to a predetermined layer, and the user identification information contained in said data part is used by a protocol with respect to a layer higher than said predetermined layer.

6. A computer-readable medium storing a data transmission program for a computer that transmits data received from a client to a destination, the data transmission program causing said computer perform operations, comprising:
   storing client identification information and user identification information uniquely determined by authentication ID and password authenticated by Post Office Protocol (POP);
   determining whether the client identification information of the client which transmits the data and sender user identification information of the user are stored in correspondence to each other; and
   controlling not to transmit the data received from said client to the destination when determined that the client identification information of the client which transmits the data and sender user identification information of the data are not stored in correspondence to each other.

7. A data transmission server for transmitting data received from a client to a destination, the data transmission server, comprising:
   first memory means for storing client identification information and user identification information uniquely determined by authentication ID and password authenticated by Post Office Protocol (POP), the client identification information and the user identification information being stored in correspondence to each other;
   first determining means for determining whether the client identification information of the client which transmits the data and sender user identification information are stored in said first memory means in correspondence to each other; and
   controlling means for controlling not to transmit the data received from said client to the destination when the first determining means determines that the client identification information of the client which transmits the data and the sender user identification information of the data are not stored in said first memory means in correspondence to each other.

8. The data transmission server as claimed in claim 7, further comprising:

authentication means for performing an authentication of said user by using a second memory means that stores user authentication information and the user identification information of the user who operates said client in correspondence to each other; and storing mean for storing, after completion of the authentication, in said first memory means the client identification information, the user identification information and effective term information.

9. The data transmission server as claimed in claim 8, further comprising:

second determining means for determining whether a record containing the client identification information is stored in said first memory means;

third determining means for determining whether the record stored in said first memory means is effective with reference to effective term information contained in the record; and fourth determining means for determining whether the user identification information contained in the record that contains the client identification information matches the user identification information contained in the header part and the data part of the data.

10. The data transmission server as claimed in claim 9, wherein the data received from said client is transmitted to the destination when affirmative determinations are made by said second, third, and fourth determining means that: the record containing the client identification information is stored in said first memory means;

the record stored in said first memory means is effective with reference to effective term information contained in the record; and the user identification information contained in the record that contains the client identification information matches the user identification information contained in the header part and the data part of the data.

11. The data transmission server as claimed in claim 7, wherein the user identification information contained in said header part is used by a protocol with respect to a predetermined layer, and the user identification information contained in said data part is used by a protocol with respect to a layer higher than said predetermined layer.

* * * * *

UNITED STATES PATENT AND TRADEMARK OFFICE
CERTIFICATE OF CORRECTION

PATENT NO. : 7,610,612 B2
APPLICATION NO. : 10/898362
DATED : October 27, 2009
INVENTOR(S) : Ishibashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Twelfth Day of October, 2010

David J. Kappos
*Director of the United States Patent and Trademark Office*